UNITED STATES PATENT OFFICE.

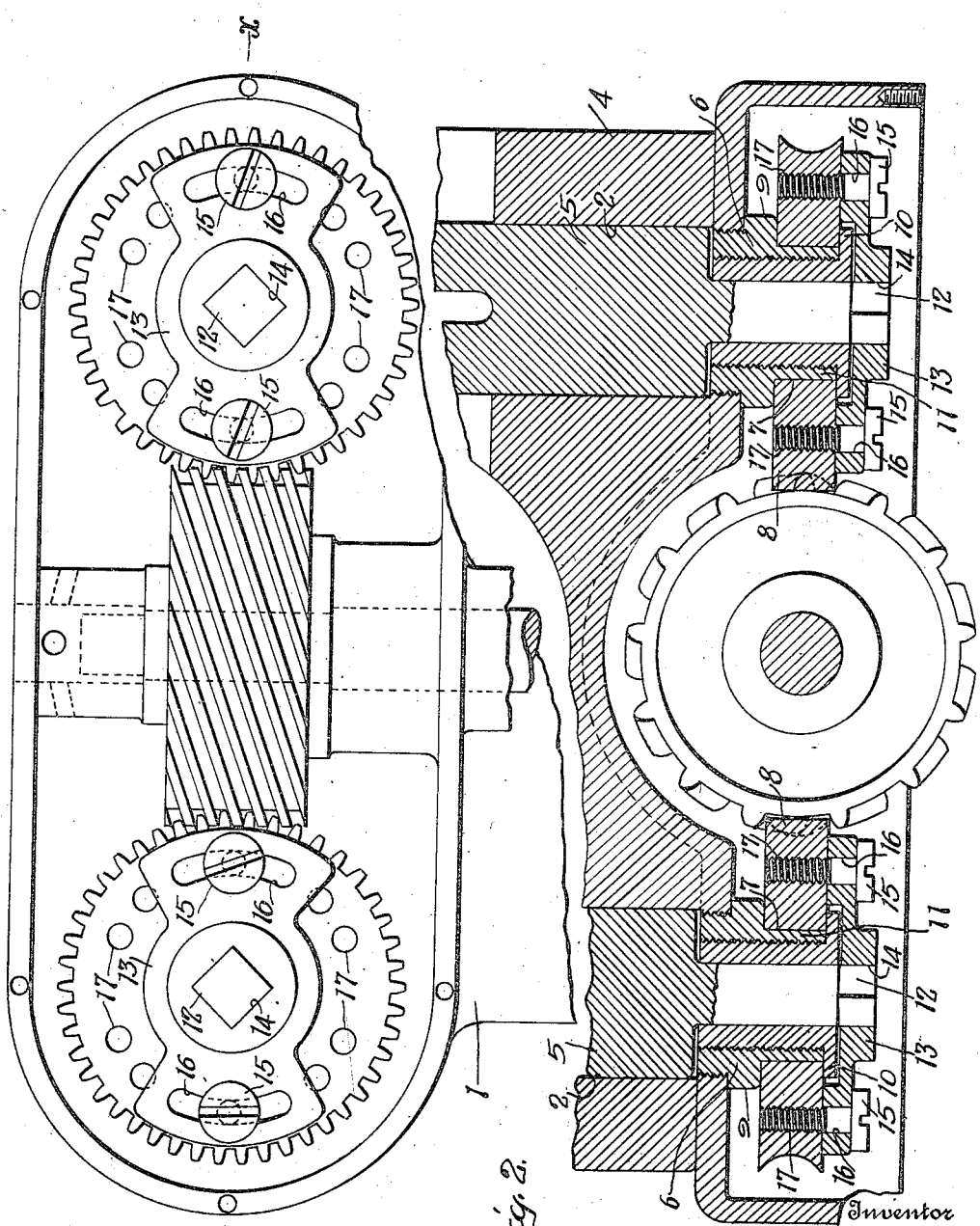

CYRUS E. MEAD, OF DAYTON, OHIO, ASSIGNOR TO THE MEAD ENGINE COMPANY, OF DAYTON, OHIO, A CORPORATION OF OHIO.

ROTARY VALVE FOR EXPLOSIVE-ENGINES.

1,075,452.

Specification of Letters Patent.     Patented Oct. 14, 1913.

Application filed October 6, 1911. Serial No. 653,100.

*To all whom it may concern:*

Be it known that I, CYRUS E. MEAD, a citizen of the United States, residing at Dayton, in the county of Montgomery and State of Ohio, have invented certain new and useful Improvements in Rotary Valves for Explosive-Engines, of which the following is a specification, reference being had therein to the accompanying drawing.

This invention relates to rotary valves for explosive engines and more particularly to driving mechanism for valves of this character.

The object of the invention is to provide a driving mechanism in which the driving member will be so connected with the valve that the latter will be free to expand and contract and that no thrust will be exerted upon the valve by the driving member.

To this end it is a further object of the invention to mount the driving member independently of the valve and connect the same thereto.

It is also an object of the invention to make the connection between the driving member and the valve adjustable to enable the timing of the valve to be regulated.

In the accompanying drawings, Figure 1 is an end elevation of the upper portion of an explosive engine showing my invention applied thereto; and Fig. 2 is a sectional view, taken on the line x x of Fig. 1.

In these drawings I have illustrated one embodiment of my invention and have shown the same as applied to an explosive engine of a known construction, comprising cylinders 1 and having bores 2 extending longitudinally to the upper portion thereof upon each side of the cylinder. The valve chambers communicate with the cylinders by means of ports 3 and with the inlet and exhaust, respectively, by means of other ports 4. Mounted in each valve chamber is a cylindrical valve 5 having through-and-through ports arranged to register at intervals with the ports of the valve chamber. These valves are rotated by means of suitable driving mechanism which is actuated from the engine shaft. In order that the valves may have what is known as a "floating" support within the valve chambers, and may thus be free to expand and contract, and to eliminate all thrust between the driving member and the valve I have mounted the driving member upon the engine independently of the valves and have then so connected the driving member to the valves as to leave the valves free to expand and contract. In that form of construction here shown a hollow stud 6 is mounted in the end of the engine frame in alinement with each valve and is here shown as connected to the frame by screwing the same into an opening in the end thereof. The outer end of this hollow stud has a bearing portion 7 on which is mounted the driving member, here shown as a worm gear 8. This driving member is free to rotate on the bearing portion 7 of the stud and is held against longitudinal movement in one direction thereon by means of a flange 9 formed integral with the stud and is held against longitudinal movement in the other direction by means of a flange 10 carried by a bushing 11 which is screw-threaded into the hollow stud 6. A valve stem or pintle 12 extends through the bushing 11 and beyond the outer end thereof. This stem preferably fits very loosely in the bushing so as not to interfere with the free movement of the valve. The end of the stem 12 is so connected with the driving member 8 that it will rotate in unison therewith. This connection in the present instance is formed by means of a plate 13 having an angular opening 14 to receive the end of the stem 12, that portion of the stem which enters the opening 14 being angular to hold the parts against relative rotation but to permit the stem to have longitudinal movement relatively to the plate. The plate is connected to the driving member 8 by means of screws 15 extending through the plate and into the driving member. Preferably, the plate is provided with segmental slots 16 through which the screws extend and which enable the plate and, consequently, the valve which is connected thereto, to be adjusted relatively to the driving member, thereby permitting the valves to be regulated to time the opening and closing of the ports. The finer adjustments are secured by means of the slots 16 and screws 15, but in order to permit of larger adjustments than can be made with the slot the gear is provided with a series of screw holes 17 in any one of which the respective screws may be inserted.

The operation of the device will be readily understood from the foregoing description and it will be apparent that the driving mechanism is so supported that it will impart a rotary movement to the valve without exerting any thrust on the valve or in any way interfering with the expansion and contraction of the valve.

It will be apparent that while I have shown the invention as applied to a rotary valve it is applicable to other rotary members which are commonly constructed with a driving or driven member, such as a gear, directly connected thereto and that in this manner the rotary member and the gear, which may be either a driving member or a driven member, are caused to rotate absolutely in unison without any lost motion and are so supported as to have certain movements relatively one to the other. This loose connection is, in the present instance, a sliding connection which permits of the expansion and contraction of the valve relatively to the gear. The fixed support for the gear prevents any thrust being exerted upon the valve.

While I have described one embodiment of the invention and have shown the same as applied to one type of engine it will be obvious that the invention can be readily applied to engines of various kinds and is capable of being embodied in various mechanisms.

Furthermore, the invention is not limited necessarily to a rotary valve but may be applied to any rotary device which it is desired to provide with a positive driving member and which it is also desirable should have movement relatively to that member.

It will be understood, of course, that the terms "driving member" and "gear" as herein employed are intended to include similar devices which accomplish similar results.

It will be obvious that any of the well known devices for transmitting power may be substituted for the worm gear here shown and that the invention is equally applicable to all such devices. I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. In an explosive engine having a valve chamber, a valve mounted in said chamber and having movement about a longitudinal axis, a driving member mounted exteriorly on said engine independently of said valve and having its axis substantially coincident with the axis of said valve, and an operative connection between said driving member and said valve.

2. In an explosive engine, having a valve chamber, a valve mounted in said chamber and having movement about a longitudinal axis, a driving member mounted on said engine independently of said valve and having its axis substantially coincident with the axis of said valve, and an adjustable connection between said driving member and said valve.

3. In an explosive engine having a valve chamber, a valve rotatably mounted in said chamber, a rotatable driving member having its axis substantially coincident with the axis of said valve, a fixed support for said driving member supported exteriorly on said engine, and a connection between said driving member and said valve.

4. In an explosive engine having a valve chamber, a valve rotatably mounted in said chamber, a rotatable driving member, a fixed support for said driving member carried by said engine, and an adjustable connection between said driving member and said valve.

5. In an explosive engine having a valve chamber, a valve rotatably mounted therein, a hollow stud rigidly secured to said engine in alinement with said valve chamber, a driving member rotatably mounted on said stud, a stem rigidly secured to said valve and extending loosely through said hollow stud, and a connection between said stem and said driving member.

6. In an explosive engine having a valve chamber, a valve rotatably mounted therein, a hollow stud rigidly secured to said engine in alinement with said valve chamber, a driving member rotatably mounted on said stud, a stem rigidly secured to said valve and extending loosely through said hollow stud, and a plate mounted on the end of said stem, held against rotation relatively thereto and secured to said driving member.

7. In an explosive engine having a valve chamber, a valve rotatably mounted therein, a hollow stud rigidly secured to said engine in alinement with said valve chamber, a driving member rotatably mounted on said stud, a stem rigidly secured to said valve and extending loosely through said hollow stud, and a plate mounted on the end of said stem, held against rotation relatively thereto and adjustably connected with said driving member.

8. In an explosive engine having a valve chamber, a valve rotatably mounted therein, a hollow stud rigidly secured to said engine in alinement with said valve chamber, a driving member rotatably mounted on said stud, a stem rigidly secured to said valve and extending loosely through said hollow stud, and a plate mounted on the end of said stem, held against rotation relatively thereto and having slots therein, and screws extending through said slots into said driving member.

9. In an explosive engine having a valve chamber, a valve rotatably mounted in said chamber, a hollow stud rigidly secured to said engine in alinement with said valve chamber, a gear rotatably mounted on said stud, a bushing mounted within said stud and having an outwardly extending flange to hold said gear against outward movement, a stem carried by said valve, extending loosely through said bushing and having its outer end angular in cross section, a plate having an angular opening to receive the end of said stem and having segmental slots on opposite sides of said opening, and screws extending through said slots into said gear.

10. The combination, with a rotary member, and a rotary driving member extending about the first-mentioned rotary member and supported independently thereof, of an operative connection between said rotary members.

11. The combination, with a rotary member, and a rotary driving member extending about the first-mentioned rotary member and supported independently thereof, of a connection between said rotary members to cause them to rotate in unison but to permit one of said members to have certain movement relative to the other.

12. The combination, with a rotary member and a driving gear for said member, of a hollow support for said gear supported independently of and in alinement with said member, said member having a part extending through the hollow support, and an operative connection between the projecting part of said rotary member and said gear.

13. In an engine, a rotary member, a driving gear for said member extending about the latter and supported independently thereof, and a connection between said rotary member and said gear to cause said parts to rotate in unison but to permit one of said parts to have movement relatively to the other.

14. In an explosive engine, a rotary member, a gear mounted to rotate about an axis substantially coincident with the axis of said rotary member, means carried by said engine to support said gear independently of said rotary member, and a connection between said rotary member and said gear to cause said rotary member to rotate in unison but to permit one of said members to have movement relatively to the other.

In testimony whereof, I affix my signature in presence of two witnesses.

CYRUS E. MEAD.

Witnesses:
HARRIET L. HAMMAKER,
L. W. JAMES.